I. BARKER.
FARM GATE.
APPLICATION FILED AUG. 17, 1914.
1,168,589.
Patented Jan. 18, 1916.
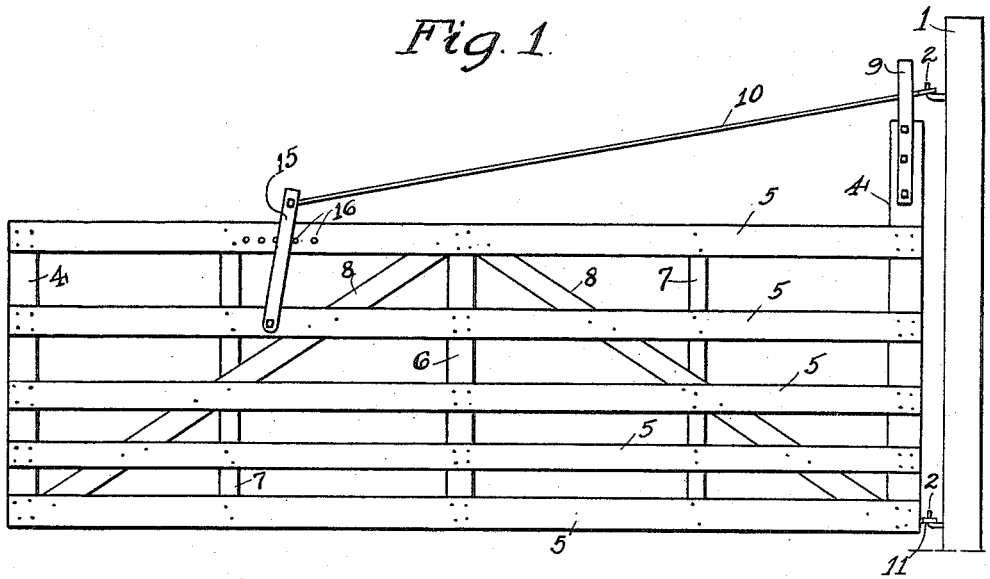
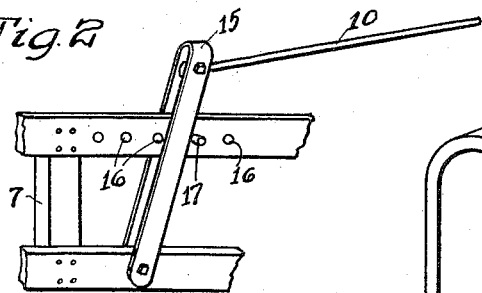
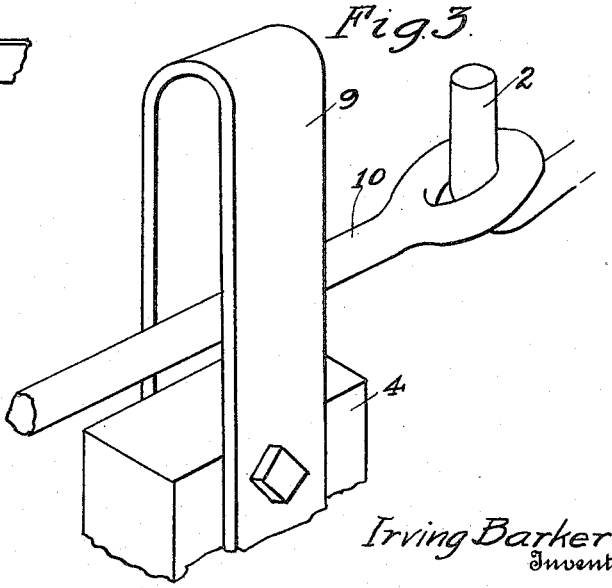
Irving Barker
Inventor
By Fred. D. Silloway
Attorney
Witnesses

UNITED STATES PATENT OFFICE.

IRVING BARKER, OF SPRINGFIELD, ILLINOIS.

FARM-GATE.

1,168,589.  Specification of Letters Patent.  Patented Jan. 18, 1916.

Application filed August 17, 1914. Serial No. 857,261.

*To all whom it may concern:*

Be it known that I, IRVING BARKER, a citizen of the United States, residing at Springfield, in the county of Sangamon and State of Illinois, have invented the new and useful Improvements in Farm-Gates, of which the following is a specification.

My invention relates to improvements in farm gates, and comprises new and useful means for hanging a farm gate, wherein provision is made for compensating for sag in a gate or gate post.

Another important feature of the invention lies in the peculiar design of the gate, which provides a strong light construction, easy to handle, and inexpensive of manufacture.

With the above and other objects in view, my invention comprises the peculiar construction and arrangement of parts, which will be hereinafter fully described, illustrated in the annexed drawings, and pointed out more specifically in the appended claims.

In the accompanying drawings, wherein a preferred embodiment of my invention is illustrated, like reference characters refer to like or corresponding parts throughout the several views.

Figure 1 is a side elevation of my gate. Fig. 2 is a detail perspective view of the adjustment device for compensating for sag of the gate or post. Fig. 3 is a detail perspective view of the upper hanger.

Referring now to the drawings, numeral 1 designates a gate post provided with spaced apart hooks 2, to which my gate is hung. The gate comprises two upright end pieces 4, and a central upright 6, to which are bolted parallel stringers 5, numerals 8 designating angular braces extending diagonally upward from the lower corners of the gate inward to the central upright. Uprights 7 are positioned above and below braces 8, and are spaced on each side of the central upright.

I prefer to extend the end piece 4 nearest the gate post upward above the top of the gate, and on the upper end of that end piece, I provide an inverted U-shaped strap 9 bolted to the end piece. An eye-rod 10 passes through the loop thus formed, and the eye engages upper hook 2 on the gate post. A screw eye 11 carried by the lower corner of the gate likewise engages the lower hook 2 of the post. Eye-rod 10 passes diagonally downward above the gate to engage a swinging adjusting link 15 pivoted at its lower end to the second highest stringer 5 of the gate. A series of adjusting holes 16 are provided in the upper stringer, and a pin 17 provided behind the link to engage selectively in the holes 16.

It will be readily seen that the means of adjustment shown will readily compensate for sag in the gate or post. Should the post lean, the swinging link 15 may be rotated about its pivoted lower end, and a new adjusting hole 16 on the upper stringer engaged by pin 17. The entire gate will thus be raised or lowered at the outer end. This construction also makes it possible for the operator to lift the outer end of the gate over obstructions when opening or closing the gate, the link allowing the raising of the gate but insuring the return of the gate to the normal adjusted position.

From the foregoing description, it will be seen that my invention provides a novel form of construction for a farm gate, wherein is provided effective means for adjusting the gate to compensate for sag therein, or for taking up the sag when the gate post leans from a perpendicular position.

While I have herein described and illustrated the preferred embodiment of my invention, I do not wish to be limited strictly to the details shown, as it is obvious that the arrangement and construction may be varied in many ways, without departing from the import of the appended claims.

Having thus described my invention, what I claim is:—

1. In a farm gate, the combination with a gate frame-work, of a hanger for the gate comprising spaced apart hooks carried by a gate post, an eye-bolt carried by the gate and engaged to the lowermost of said hooks, an eye-rod engaged to the uppermost of the hooks and extending diagonally downward to the center of the gate, bracing means for the eye-rod comprising a U-shaped strap iron attached to the gate and adapted to receive the eye-rod therethrough, a swinging link carried by the gate and pivoted to said eye-rod, and adjustable stop means for said link.

2. In a farm gate, the combination with the gate frame work comprising parallel stringers, of hanger means for the gate comprising spaced apart hooks carried by the gate post, an eye-bolt carried by the gate and engaged to the lowermost of said hooks, an eye-rod engaged to the uppermost of the hooks and extending diagonally to the center of the gate, a link pivoted at its lower end to the second stringer on the gate, the upper stringer provided with adjusting holes therethrough, a removable pin engaging the rear side of the link and adapted to engage selectively in the holes in the upper stringer, and the upper end of the link pivoted to the inner end of the eye-rod, substantially as described.

IRVING BARKER.

Witnesses:
 LEO MATTHEUS,
 MARGARET ESSLINGER.

Copies of this patent may be obtained for five cents each, by addressing the "Commissioner of Patents, Washington, D. C."